(12) United States Patent
Agranoff et al.

(10) Patent No.: US 7,908,262 B2
(45) Date of Patent: Mar. 15, 2011

(54) SYSTEM AND METHOD FOR PROVIDING SEARCH ENGINE-BASED REWARDS

(75) Inventors: Brian Keith Agranoff, Sherwood, OR (US); Cameron Clarke Nelson, Pendleton, OR (US)

(73) Assignee: SurfJar, Inc., Sherwood, OR (US)

( * ) Notice: Subject to any disclaimer, the term of this patent is extended or adjusted under 35 U.S.C. 154(b) by 359 days.

(21) Appl. No.: 12/070,656

(22) Filed: Feb. 19, 2008

(65) Prior Publication Data

US 2009/0210392 A1    Aug. 20, 2009

(51) Int. Cl.
*G06F 7/00* (2006.01)
*G06F 17/30* (2006.01)

(52) U.S. Cl. ........ 707/706; 707/707; 707/709; 707/716; 705/14; 705/14.16; 705/14.25

(58) Field of Classification Search ................... 707/706, 707/707, 709, 716; 705/5, 10, 14, 14.16, 705/14.25, 14.44, 14.55
See application file for complete search history.

(56) References Cited

U.S. PATENT DOCUMENTS

| | | | | |
|---|---|---|---|---|
| 5,826,025 | A * | 10/1998 | Gramlich | 709/217 |
| 7,013,310 | B2 * | 3/2006 | Messing et al. | 707/999.104 |
| 2002/0062249 | A1 * | 5/2002 | Iannacci | 705/14 |
| 2004/0162761 | A1 * | 8/2004 | Comer | 705/14 |
| 2006/0123053 | A1 * | 6/2006 | Scannell, Jr. | 707/104.1 |
| 2008/0195492 | A1 * | 8/2008 | Postrel | 705/14 |
| 2008/0281706 | A1 * | 11/2008 | Sullivan | 705/14 |
| 2009/0299820 | A1 * | 12/2009 | Wang et al. | 705/10 |
| 2010/0106703 | A1 * | 4/2010 | Cramer | 707/706 |

OTHER PUBLICATIONS

Michael T. Capizzi & Rick Ferguson—"Loyalty Trends for the $21^{st}$ Century"—Journal of Targeting, Measurement and Analysis for Marketing, vol. 2, No. 3.1, Feb. 2004 (pp. 199-212 (1-13 pages).*
Ai-Mei Chang, P.K. Kannan & Andrew B. Whinston—"Goodies" in Exchange for Customer Information on the Internet: The Economics and Issues—System Sciences, 1998, Proceedings of the Thirty-First International Conference, Jan. 6-9, 1998, (pp. 1-10).*

* cited by examiner

*Primary Examiner* — John Breene
*Assistant Examiner* — Anh Ly
(74) *Attorney, Agent, or Firm* — James G. Stewart PC

(57) ABSTRACT

A system for enhancing search engine-based search results comprises an application programming interface configured to add value to selected search engine-based web search, a tag indicative of the value-added capacity that is appended to one or more links; a client that accepts a search request and enables an integrated view responsive to the request; and a web server for fetching the integrated web data upon receiving a request for selected search-engine-based web search. The enhanced search engine-based web search system further comprises a content manager that is configured to store and calculate the added value in a personal account of a web user. The added value is retrievable by the user. Search engine-based online search enhancing system and methods also are described.

32 Claims, 12 Drawing Sheets

SYSTEM AND METHOD FOR PROVIDING SEARCH ENGINE-BASED REWARDS

FIELD OF THE INVENTION

The invention relates generally to the field of on-line Internet or World-Wide Web searching. More particularly, the invention relates to a reward system for web users who visit websites linked as a search engine's search results responsive to the web users' requests.

BACKGROUND OF THE INVENTION

The systems and tools of various embodiments of the present invention may include workstations, network devices, database systems, and methods to assist merchants creating a novel consensual advertising technique while optimizing their advertisement resources. The systems and tools benefit the web users by allowing them to be more discriminating in their search engine-based web search.

Merchants traditionally advertise their products or services online through websites. They sign up with search engine providers for a "space" in the latter's advertising networks. The merchant advertisers pay for their spaces in such advertising networks. Typically, the merchant advertisers pay the search engine providers, or the hosts of the advertising networks, a fee based on the number of clicks on a particular link to their respective websites. This online advertising model is frequently referred as the "Pay Per Click" or PPC method. In general, these paid advertising contents are referred to as "sponsored ads" or "sponsored domain" or "sponsored links" to information about the sponsor's services or products. This "sponsored" advertising model has become an increasingly important means in the commercial world nowadays for the merchant advertisers to reach potential consumers. Although relatively effective, this online marketing means comes with an increasingly high cost for the merchants to advertise online and produces only a limited return on investment (ROI).

When signing up with a search engine provider, a merchant advertiser typically provides a keyword list and bids for the highest possible listing position in the search engine provider's advertising network. The keywords must efficiently represent the advertised services or products to ensure a high click-through rate based upon matching with the search terms that are input by web users in search for information about such services or products.

In the PPC world, paid or sponsored ads constitute an invitation to web users to visit the advertiser's website that contains information about a particular service or product. A web user may accept the invitation by a single interaction with a web browser or a graphic user interface (GUI) device, i.e., a click on a link to the web data in the paid or sponsored domain. There is no consensual relationship between the advertiser and the web users, because the web users exist as a group only incidental to the contract between the advertiser and the search engine provider. The web users thus receive no benefit in monetary or other tangible value from the online advertising contract.

When a web user who seeks information about a product enters a keyword, phrase, or product model number into a search bar of the web browser or GUI device, a client system sends the request query to a server and fetches web pages that contain information about the product. Upon receiving such request query, the server collects, sorts, and sends to the client system relevant search results, which can be hyperlinks to web data in the natural as well as the paid/sponsored domains. As a common practice, a list of hyperlinks to the web data in the paid or advertiser-sponsored domain, for example, on the right-hand side of a browser window, while those natural or non-sponsored hyperlinks occupy the main, central-left section of the browser window. Psychologically, normal web users may stay away from the paid hyperlinks for fear of being bombarded by highly commercialized information. Although the paid or sponsored hyperlinks invite visits, the web users enjoy an absolute right to ignore their existence while devoting themselves to the natural search engine results. As a result, the click-through rate on the hyperlinks to web data in the paid/sponsored domain typically is much lower than that for those in the natural/non-sponsored domain.

SUMMARY

The present invention comprises systems and methods of implementing a SurfJar™ web programming application software. In accordance with an embodiment of the present invention, a system for providing search engine-based web data integration comprises an application programming interface that is configured to add value to selected search engine-based web search. The application programming interface provides links that effectuate an instant navigation to a landing page that contains integrated web data, resulting from the selected search engine-based web search. The system comprises a tag indicative of the value-added capacity of the selected search engine-based web search that is appendable to one or more of the links. The search engine-based web data integration system also comprises a web browser and a SurfJar™ web server. The web browser, i.e., a client system, is operable to accept a request from a web user and enables an integrated view responsive to the request, the integrated view displaying the integrated web data. The SurfJar™ web server fetches the integrated web data upon receiving a request for selected search engine results. A content manager is configured into the SurfJar™ web server to store and calculate the added value in a personal account of a user, the added value retrievable by the user.

The system further comprises a rewarding mechanism by which to enable one or more merchants to reward the web users based on their visits to the integrated web data available at freely accessible domains. The rewarding mechanism further enables web users to become system subscribers by way of subscription to the rewarding mechanism. In addition, the system comprises a search engine that is integrated to assist in traversing metadata over the Internet for the selected search engine results.

The system is further configured to include a value indicator, an iconographic symbol, or a tag, that can be appended to one or more links. The rewards include redeemable points with monetary value, free merchandises or services, and coupons that offer discount to purchase of certain merchandises or services provided by participating merchants. The rewards become available to subscribers upon their single interaction with a tagged link. In addition, the redeemable reward points or their money value is directable by subscribers to designated destinations, which comprises one or more of a family member, a friend, a charity and a not-for-profit organization.

In accordance with another embodiment of the present invention, a search engine-based online search enhancing system comprises a reward server to store freely accessible web data, a client to provide a user interface, and a rewarding mechanism configured to add value to selected use of a search engine. The reward server provides the client with the freely accessible web data upon receiving a request for a selected search engine-based online search. The client provides a user interface for receiving a request from a web user and displays one or more links responsive to the request. The rewarding mechanism establishes a platform that enables participating merchants to entice subscribers to visit their web pages and facilitates subscription to their web data. The enticement is realized by way of appending an iconographic symbol, e.g., a distinctive tag indicative of value-added capacity, along with awardable rewards to a link that provides instant navigation to web data responsive to a particular search request.

The rewarding mechanism comprises tools and devices that make value rewarding ready and simple: the added value becomes awardable to a subscriber based on a click on a tagged link or a visit to freely accessible web pages provided by a participating merchant.

In accordance with an embodiment of the present invention, an enhancing search engine-based search method comprises establishing with one or more merchants a rewarding mechanism for awarding subscribers who visit their web pages; appending to selected search engine-based search results a visible tag indicating to the subscribers a value-added capacity; and activating a reward server upon actuating a click on a tagged entry, the reward server configured to offer rewards for subscription to the tagged entry. The method comprises enabling the merchants to reward subscribers to their web pages by way of tagged entries associated with the offering merchants. In addition, the method comprises enticing the subscribers to select search engine-based search results from the tagged entries for a reward; and facilitating a reward account management to the subscribers for earned rewards. The method further comprises providing one or more portable compartments, each having a categorical label indicating a destination of the earned rewards.

In another embodiment of the present invention, a method for augmenting a web use of a search engine comprises contracting with a merchant to offer rewards to visitors of a website provided by a merchant; subscribing a user to a reward service; annotating a contracted link presented as a search result with an icon indicative of a reward offer; detecting selection by a subscribing user of such an annotated link; providing a reward server configured to fulfill a reward request from the user who selected the annotated link; and providing a user interface configured to permit the user to designate one or more reward receivers to place a reward fulfilled by the reward server. The method further comprises providing a mechanism for integrating the reward service, the user interface, and the reward server operable to augment the use of a search engine.

DETAILED DESCRIPTION OF THE PREFERRED EMBODIMENTS

SurfJar™ is a trademark owned by SurfJar, Inc.

Figure 1:
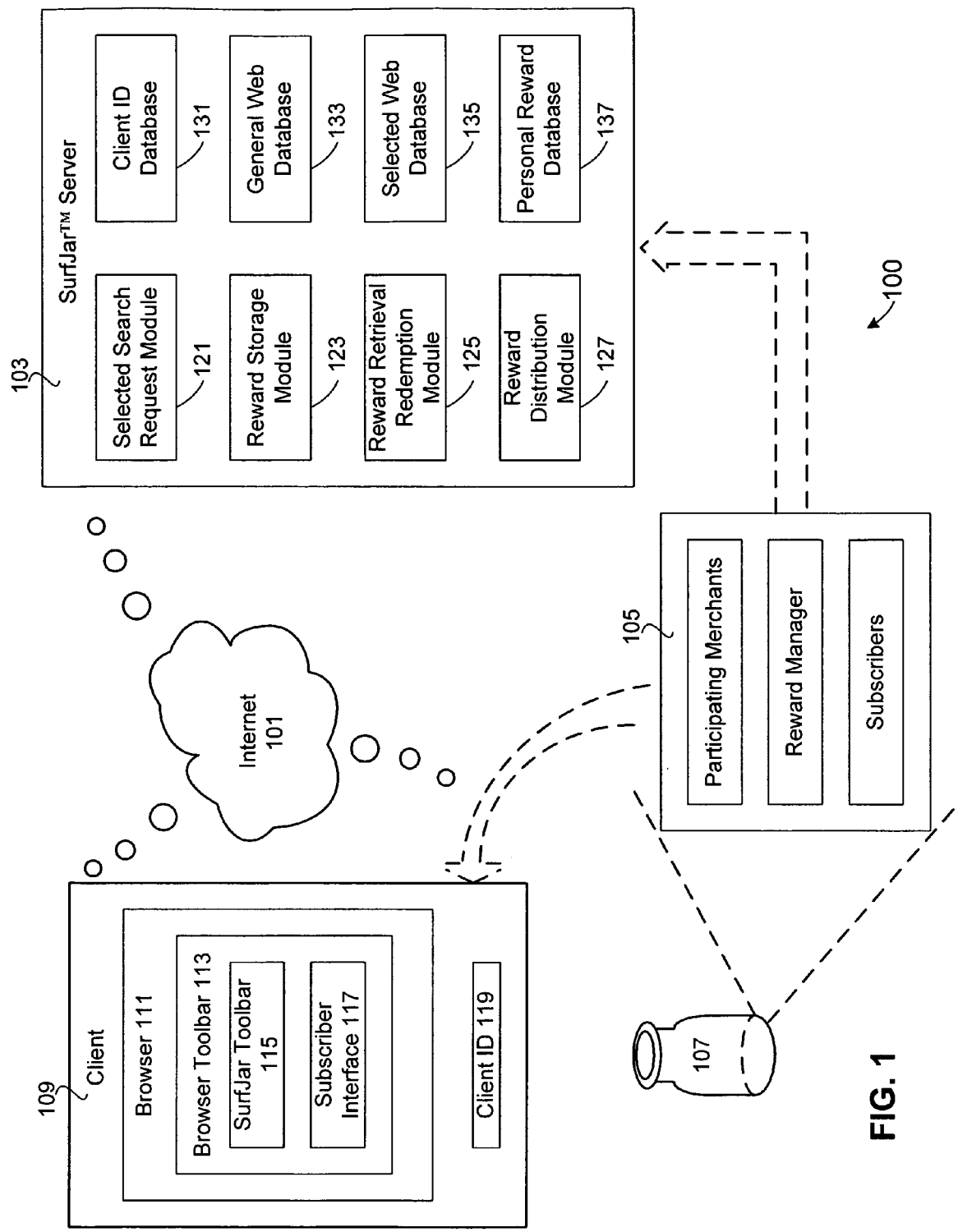
FIG. 1 is a simplified schematic system block diagram that illustrates the invented SurfJar™ rewarding mechanism operable to enhance search engine-based web data search by way of selected web server-client integration, in accordance with an embodiment of the present invention.

The SurfJar™ search engine-based web data search enhancing system is generally illustrated in FIG. 1, which is simplified to avoid obscuring an understanding of the embodiments with excess detail and where persons of ordinary skill in this art can readily understand its structure and functionality by way of the drawing and disclosure.

In accordance with one embodiment of the present invention, referencing FIG. 1, a SurfJar™ rewarding mechanism 105 is integrated into web programming application 100 to provide incentive to web users for their selected use of a search engine when they look for information about a product or service online. The rewarding mechanism 105 interacts over the Internet with two major components of web programming application 100, i.e., SurfJar™ server system 103 and client system 109. The client system 109 comprises its identifier 119 and web browser 111 to provide the usual user interface by way of browser toolbar 113 for purpose of being user friendly. The term "browser toolbar" is used for a ready understanding of the embodiment; those skilled in the art understand that it may be interchangeable with any other graphic user interface (GUI) tools or devices that facilitate a system's usability and accessibility. Client identifier 119 is a permanent client ID number assigned by server system 103 to client 109, when client 109 first interacts with and makes itself known to the server. After acquiring client ID 119, client 109 includes its ID in all of its communication with server 103, which further provides support to SurfJar™ rewarding mechanism 105, which is further explained in the subsequent text.

Client system 109 provides a support to SurfJar™ rewarding mechanism 105 by including in its browser 111 a SurfJar™ toolbar 115 that is compatible and interactive with other tooling components of the client system. Upon subscription to SurfJar™ rewarding mechanism 105, SurfJar™ toolbar 115 is downloaded and further integrated into client system 109. Although it may be made to appear next to the usual browser toolbar 113 in the browser window, SurfJar™ toolbar 115 is independently operable to implement subscriber interface 117 with SurfJar™ rewarding mechanism 105.

Client system 109 can be installed in a personal computer, a workstation or a handheld computing device to interact with a probably remote server system by way of a network, while client 109 provides user interface by way of web browser 111. The server system 103 includes four modules, 121, 123, 125, 127; each of which provides a communication tool to interact with client system 109. In a particular embodiment, module 121 receives requests from client 109 for search engine results in response to selected web uses. The term "selected" is used to distinguish a deliberately discriminative action from any other actions taken by a web user, when selecting and clicking on a link to gain access to web pages of interest. Typically, a search engine-based web search may fetch both natural, also known as organic or algorithmic, search results and paid, also known as advertiser-sponsored, search results. Although both types of search results are currently available to web users for free information without subjecting them to any commitment, natural search results promote search engine optimization to increase web sites' relevance.

Taking the deliberately discriminative action is motivated by an expectation of receiving rewards with monetary value. The expectation is well founded and realizable using SurfJar™ rewarding mechanism 105. Upon rewarding, module 123 automatically saves and stores rewarded value, e.g., reward points, in personal reward database 137, and feeds back to client 109 about the saved reward points. Module 125 enables web users to redeem their earned and saved reward points for a monetary figure: it receives requests from client 109 for retrieval of reward data for redemption, fetches earned reward points stored in personal reward database 137, and sends the earned reward points along with calculated monetary value to client 109. Module 127 enables web users to direct their earned rewards to designated destinations that comprises one or more of a family member, a friend, and a third party beneficiary such as a charity or a not-for-profit organization. Upon receiving requests from client 109 for directing certain reward points or their monetary value, module 127 responds with specified data and updates personal reward database 137.

Continuing with reference to FIG. 1, server system 103 comprises four or more databases, e.g., databases 131, 133, 135, 137, to support one or more related interfaces. The client ID database 131 maintains client identifier and authentication information, such as user name and password, before allowing access to some or all resources supported or provided by server 103. The general web database 133 handles static as well as dynamic contents associated with various data sources ranging from a local file system to an external program, script or application programming interface. Database 133 supports any client request for a Uniform Resource Locator (URL) in general. The selected web database 135 provides virtual hosting to serve many websites that are associated with SurfJar™ rewarding mechanism 105. As referenced in the text above, the personal reward database 137 performs personalized reward management corresponding with the client data stored in databases 131 and 135, to determine particular rewards for each of web users who have subscribed to the SurfJar™ rewarding campaign.

The SurfJar™ rewarding mechanism 105 assists merchants participating in a SurfJar™ online reward campaign reaching potential customers who are web users. When signing up an online campaign for their products or services with SurfJar™ rewarding mechanism 105, the merchants offer monetary valuables to entice web users to visit their websites or web pages that contain information about their products or services by way of rewarding mechanism 105. The visit-based monetary valuables may comprise a coupon for purchase of merchandise or service at a discounted price, free merchandise or service, and/or reward points that are accumulatible, retrievable and redeemable by a reward recipient, i.e., a web user who visited the website or web pages of the offering merchant. The monetary valuables add value to what web users already and always do—web surfing for information of interest, freely accessible web data in particular.

Figure 3:
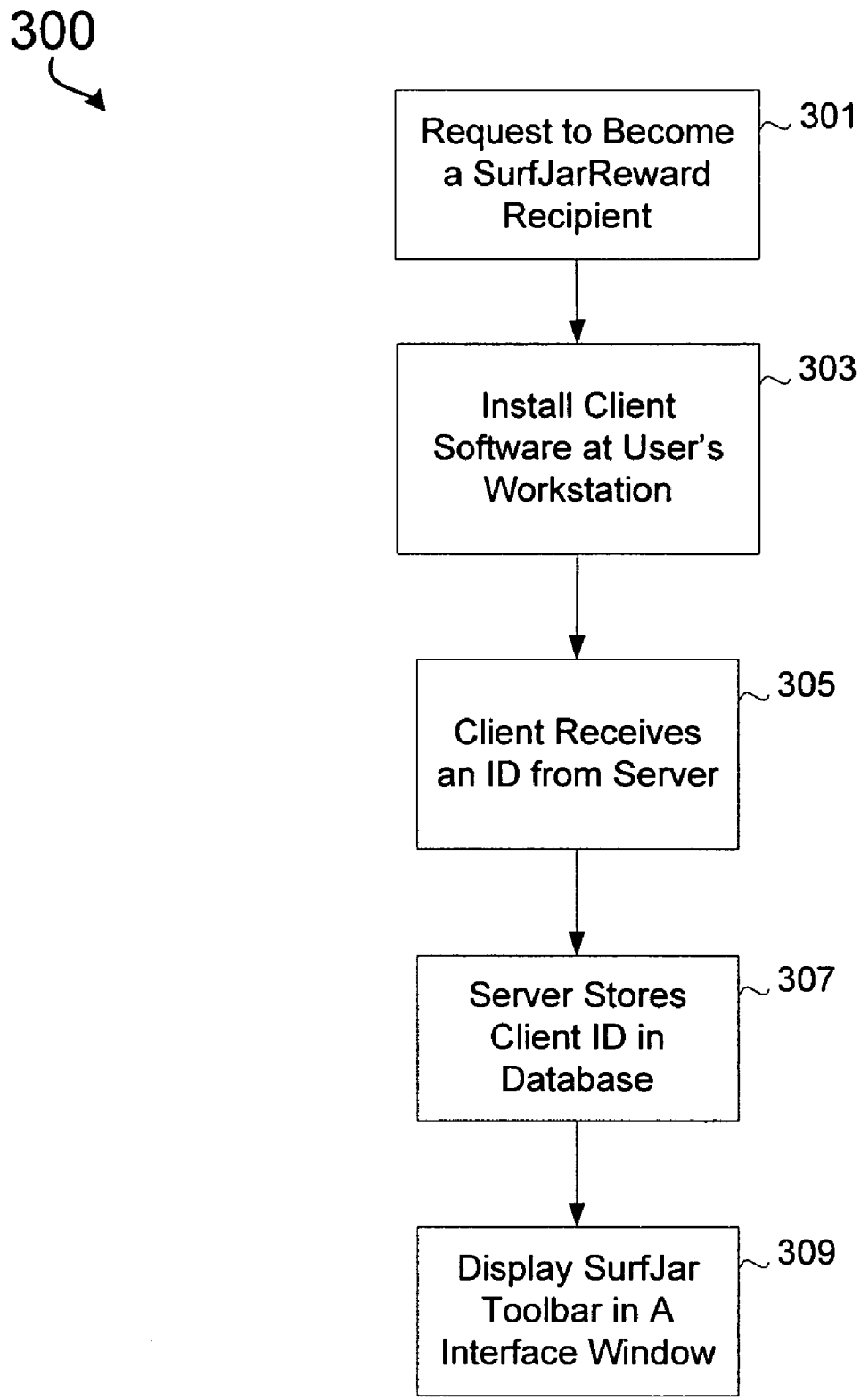
FIG. 3 is a simplified schematic flow diagram that illustrates one potential routine that creates a client system within which the SurfJar™ rewarding mechanism is embedded therewithin, in accordance with an embodiment of the present invention.

The SurfJar™ rewarding mechanism 105 also assists web users subscribing to a participating merchant's online reward/promotion campaign. In one particular embodiment of the present invention, referencing FIG. 1, a web user may visit web pages provided by a participating merchant, receive rewards offered thereby, create a portable, iconographic compartment having a categorical label indicating the merchant, and deposit the earned reward in the labeled compartment. The portable compartment can be designed as an iconographic jar in a particular embodiment. Those skilled in the art understand that such portable compartment can be also designed as a logo, a graphic object, or a colored highlighter supportable by any graphical operating system. The web user completes the subscription process by way of interacting with SurfJar™ toolbar 115 with the assistance of subscriber interface 117. The steps of downloading of SurfJar™ toolbar and associated interface software are further explained by reference to FIGS. 3 and 4.

The SurfJar™ rewarding mechanism 105 further comprise a reward account manager who assists the owner of a personal reward account managing assets in the account, the assets being the earned reward points, money values, or other tangibles. The reward manager is configured to interact with both SurfJar™ server 103 and client 109, while assisting the account owner. The assistance provided by the reward manager may include collecting, depositing, accumulating, redeeming, and/or directing of the reward assets in the account. In a preferred embodiment, a particular example of desired assistance from the reward manager may include designating the reward assets for one or more causes and setting goals specified in a reward points amount for each cause. These features are further explained with reference to FIGS. 5 and 6.

In a preferred embodiment, continuing with reference to FIG. 1, SurfJar™ rewarding mechanism 105 may be symbolized as an iconographic element 107 with indicated value-added capacity. The iconographic element 107 may be characterized to include a tab, pot, jar, folder, file, avatar, mascot, cupboard, drawer, safe, compartment, or any container that is capable of collecting and storing valuables, yet portable so that it is appendable to a link that provides instant navigation to web pages. A SurJar™ icon appendable to a link, when displayed as one of search engine results on a graphic user interface window, provides a visible distinction to the annotated link from other usual links. The link can be a hyperlink, a data pointer, an arrow icon, a web navigator, or any indicator capable of directing online navigation.

Figure 2:
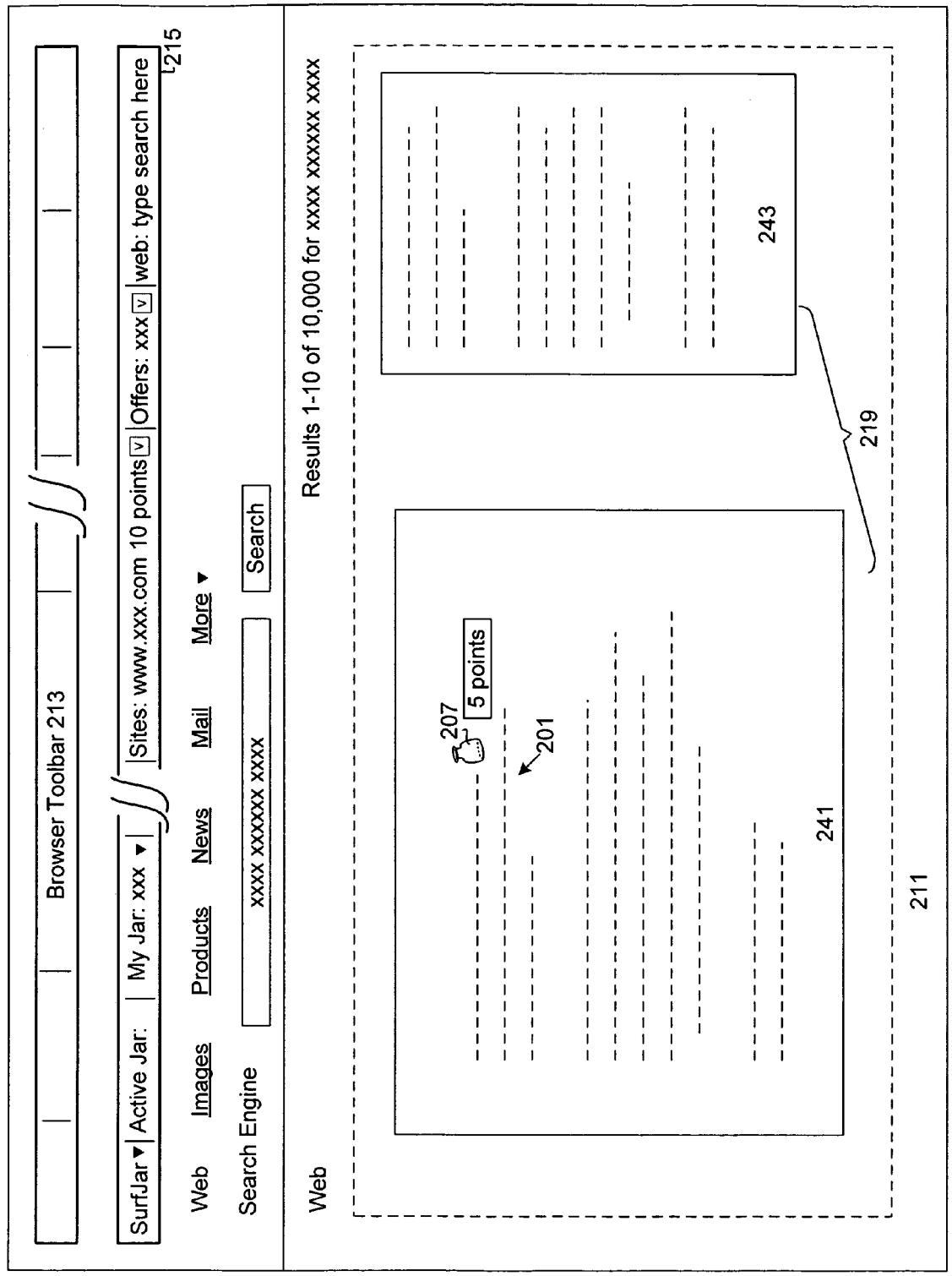
FIG. 2 is a modified view of a web browser window illustrating a SurfJar™ tag indicative of value-added capacity that is appended to a hyperlink, in accordance with an embodiment of the present invention.

FIG. 2 illustrates a display of search engine-based web search results in hyperlinks in an Internet Explorer's environment, which merely describes one particular embodiment of the present invention. Those skilled in the art understand that search engine-based web search can be facilitated by any operating systems other than Windows and that the web search results may be displayed in any graphic user interface or GUI settings, and thus may appear completely different from the one illustrated in FIG. 2.

In accordance with a particular embodiment of the present invention, referencing FIGS. 1 and 2, when server 103 returns to client 109 with search engine results 219, web browser 111 displays them on a browser sub-window 211, illustrated with dashed lines. Typically, search engine results 219 include hyperlinks 243 in the paid or sponsored domain and hyperlinks 241 in the natural or non-sponsored domain. FIG. 2 also illustrates an iconographic tag 207 indicative of this value-added capacity that is appended to a hyperlink to create a SurfJar™ link 201. A certain amount of reward points, for example, 5 points, may appear along with tag 207 to specify the value being added based on a click on SurfJar™ link 201. With functionality similar to other hyperlinks 241, SurfJar™ link 201 provides an instant navigation to a landing page containing integrated web contents of a participating merchant's website.

As illustrated in FIG. 2, a SurfJar™ link 201 is appended to a hyperlink in the natural domain, which is intended only for a preferred embodiment of the present invention. Even when paid ads are bundled with interesting programs to solicit the largest possible coverage of audience, human nature makes people tend to ignore those paid ads while searching for the content of interest. The same happens when the web links in the paid domain appear on the same browser window with those in the natural domain. Still, pages after pages of hyperlinks in both domains 241 and 243 to web pages, all responsive to a particular web search request, may dilute a search for web data of interest. The annotation of tag 207 and associated reward points to SurfJar™ link 201 not only provides an eye-catching distinction from, for example, other links in domain 241, but also presents a welcoming invitation to web users who are enticed to click on the SurfJar™ link 201 with an expectation to be rewarded.

When a web user is enticed to click on a SurfJar™ link 201, the reward points instantly become collectible with assistance from SurfJar™ application programming interface as described with reference to FIG. 1. Referencing steps 301 and 303 of FIG. 3, a client system, e.g., client 109 of FIG. 1, is created upon a request from a web user to become a subscriber to the SurfJar™ rewarding system. As the web user inputs personal information to create a personal SurfJar™ account with the assistance of user interface provided by client system 109, server system 103 of FIG. 1 generates an identifier for this particular client, which client system 109 receives from the SurfJar™ server, as illustrated by step 305 of FIG. 3. The server system 103 then stores the identifier in Client ID database 131 of FIG. 1, as illustrated by step 307 of FIG. 3. The subscription process completes when a SurfJar™ client program characterized by toolbar 215 of FIG. 2 is displayed to the subscriber's personal computer, workstation or handheld computing device (step 309 of FIG. 3). In a particular embodiment, client system 109 may display the SurfJar™ toolbar 215 next to the generic toolbar 213, whenever a search engine is activated for web searching.

Figure 4:
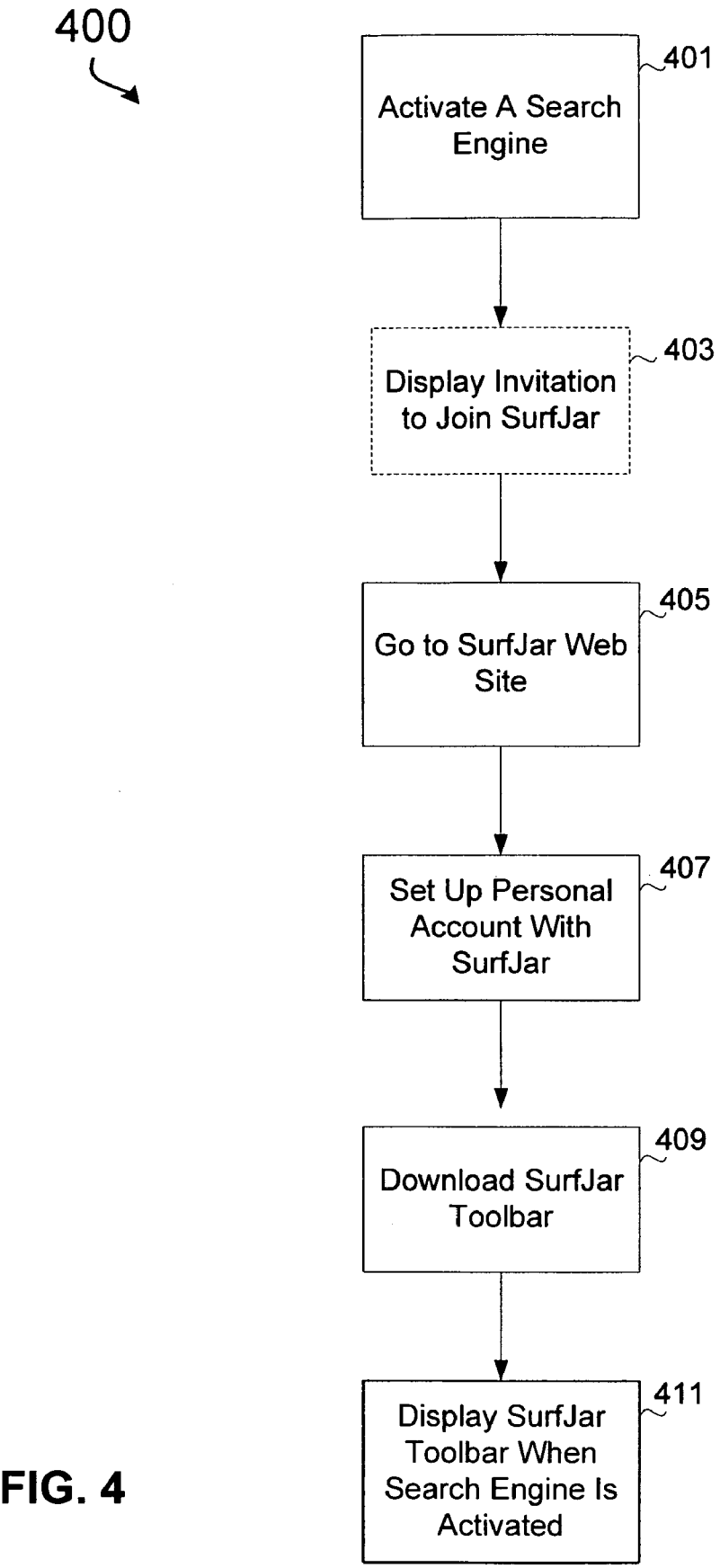
FIG. 4 is a simplified schematic flow diagram that illustrates one potential routine that enables a web user to participate in SurfJar™ rewarding system, in accordance with an embodiment of the present invention.

The SurfJar™ subscription process may be initiated by a web user as soon as a search engine is activated, referencing step 401 of FIG. 4, without initiating a search engine-based web search. The subscription may be enticed by an invitation from SurfJar™; however, the invitation is optional, which is illustrated by the dashed line around step 403 of FIG. 4. Thus, in an alternative embodiment of the present invention, web users may initiate downloading of the SurfJar™ toolbar 215 of FIG. 2 by going to SurfJar™ website independent of a search engine-based web search. The web users therefore configure their browsers or any other interface devices for incorporating a SurfJar™ subscriber interface and then become SurfJar™ subscribers known to the system by way of submission of certain basic personal information. Upon subscription, a personal reward account with SurfJar™ is created and installed in a server system, e.g., SurfJar™ server 103 of FIG. 1, as illustrated by step 407 of FIG. 4. The features including configuration of a new subscriber's browser (step 409) and display of a SurfJar™ toolbar therein (step 411) are similar to those as described earlier with reference to FIG. 3. Again, the term "browser" is interchangeable with any other interface devices for the same functionality as described here above.

Figure 5:
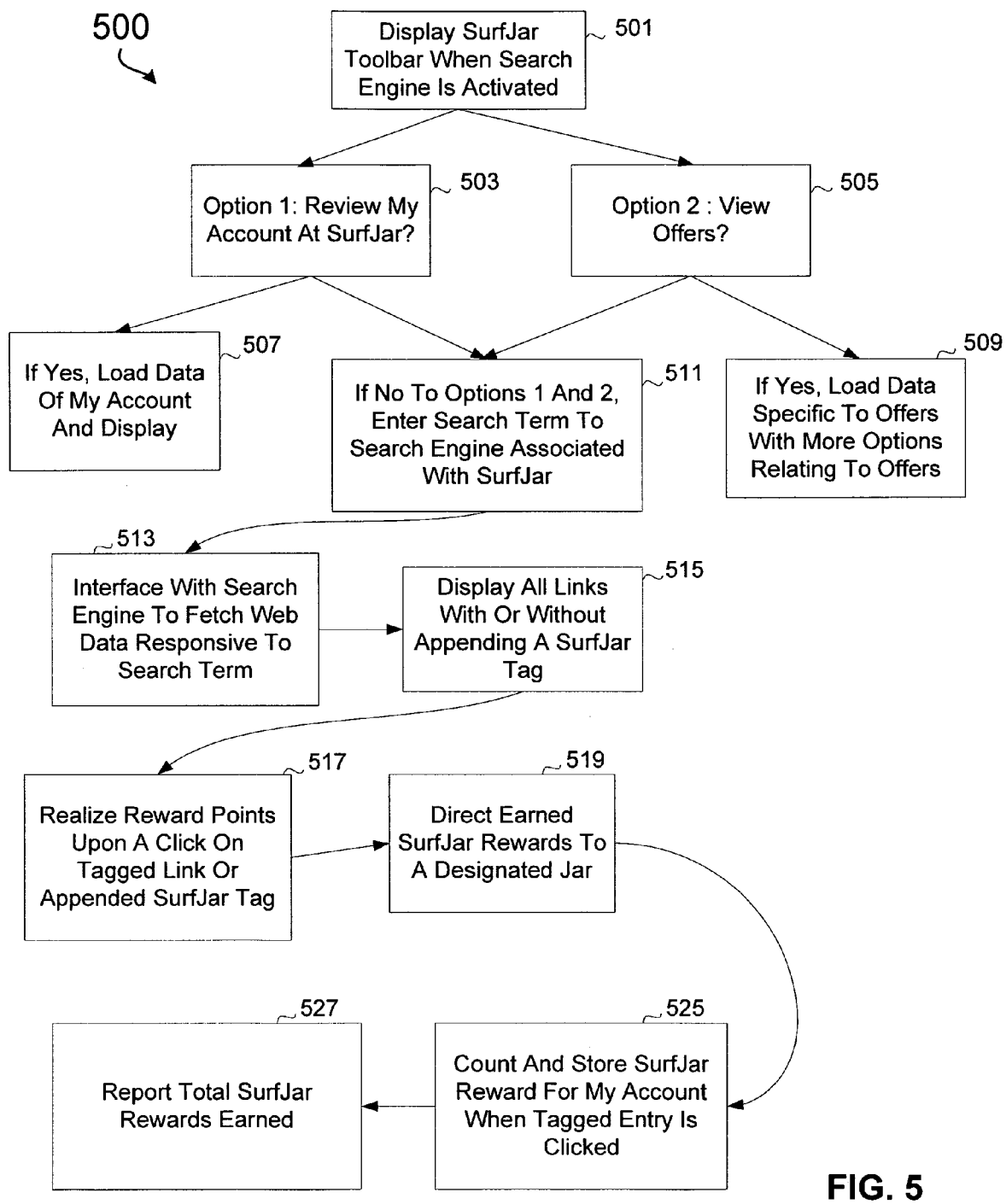
FIG. 5 is a simplified schematic flow diagram that illustrates one potential routine that enables a subscriber to receive SurfJar™ rewards, in accordance with an embodiment of the present invention.

FIG. 5 illustrates in flow diagram form one potential routine that enables a subscriber to receive SurfJar™ rewards, in accordance with an embodiment of the present invention. Upon activation of an Internet explorer or search engine, the client system displays SurfJar™ toolbar 215 next to the usual browser toolbar 213 (FIG. 2). The SurfJar™ toolbar 215 presents options for the subscribers to organize their web-surfing activities referencing blocks 503, 505 of FIG. 5. The subscribers may directly log in to check for updates or any other information about their personal reward accounts. An interaction with the paned window 701 of FIG. 7 prompts a login process with the SurfJar™ server. Upon authentication, the client system receives and displays the subscriber's personal reward data sent by the SurfJar™ server (step 507). Alternatively, the subscribers may decide to view offers of interest that are made available online by merchants. Similarly, the SurfJar™ server collects and fetches data relating to the requested offer, as illustrated by step 509. Yet, the subscribers may initiate a search engine-based search by inputting one or more search terms or keywords into a request intake of a search engine that is affiliated with SurfJar™ reward system, as illustrated by step 511.

Steps 513, 515 of FIG. 5 further illustrate the embodiment, characterized by effectuating the interface among the client system, the server and the search engine, which generates search engine-based results responsive to a search request. For example, client 109 sends request query to server 103 upon receiving a search request input by a web user, and displays on a browser/GUI window the data fetched by SurfJar™ server 103. The data comprise links to web pages of documents or files and linked objects such as graphics or images, as provided by one or more merchants who introduce to the world their products or services and promote such online. For those merchants who have participated in SurfJar™ reward campaign, their affiliation with SurfJar™ qualifies the links to their web pages to be SurfJar™ links. Each of the SurfJar™ links has a SurfJar™ icon and associated reward points annotated therewith, which may be referred to as tagged links. The client system displays the SurfJar™ links along with non-SurfJar™ links in the same browser/GUI window, as illustrated by step 515 of FIG. 5 with reference to FIG. 2. The SurfJar™ icon and associated reward points, however, attract subscribers and general web users to click on a SurfJar™ link that effectively expands to associated web pages.

Figure 8:
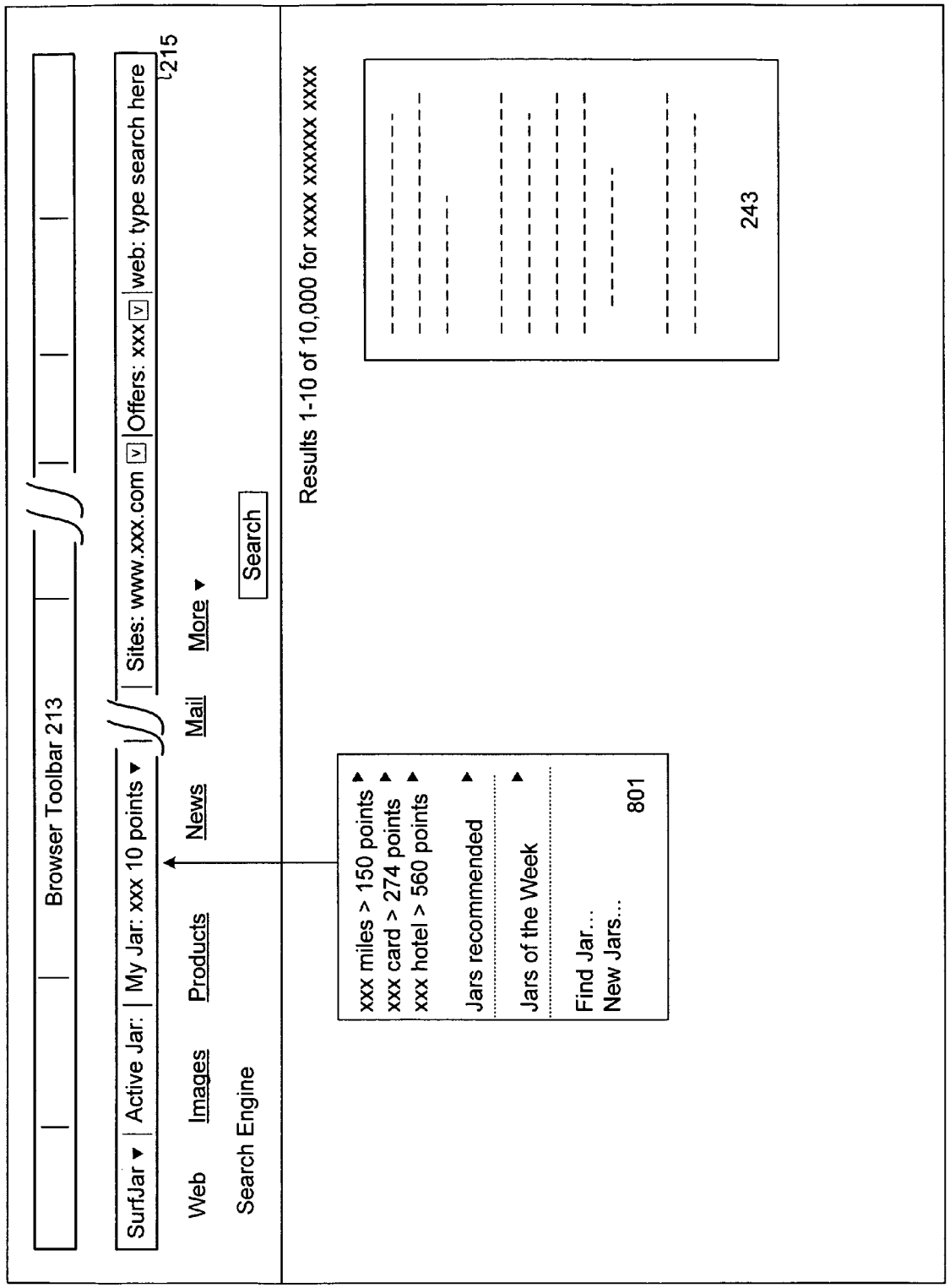
FIG. 8 is an example of an interactive window in a display for an embodiment of the present invention that enables a subscriber to manage a personal account with earned rewards or objectives, such as directing earned rewarding points to designated receivers.

A deliberated click or any actuating action on the SurfJar™ link instantly awards the indicated reward points to the user/subscriber, as illustrated by step 517 of FIG. 5. A subscriber may be able to claim the instantly earned reward points, while a non-subscribing user may have to wait until the SurfJar™ subscription process is completed, as explained above with reference to FIGS. 3 and 4. Upon claiming the instantly earned reward points, the reward points are directed to the active jar, as illustrated by step 519. The subscribers have options for directing the reward points either to a general fund, i.e., a general-purpose jar, or to a particularly designated jar (refer briefly to FIG. 8). They may direct their reward points to certain active jars by default or create new active jars to further manage their rewards. The subscriber's web-searching activities are fully supported by the SurfJar™ rewarding system that ensures and optimizes web searching activities as well as the benefits associated with such activities.

Steps 525, 527 of FIG. 5 illustrate certain features of a preferred embodiment of the present invention. The features facilitate certain functionalities of the server system that supports a cached SurfJar™ reward management. When SurfJar™ reward points are earned, the server system provides support to the personal reward manager for collecting, counting, and crediting to the corresponding personal reward account the earned reward points while the "on-the-fly" point-earning continues. SurfJar™ subscribers are able to view, update and manage their personal reward accounts by way of interacting with a web browser or a GUI device. At the end of a web searching activity, the personal reward manager reports the total reward earned, as illustrated by step 527 of FIG. 5.

Figure 6:
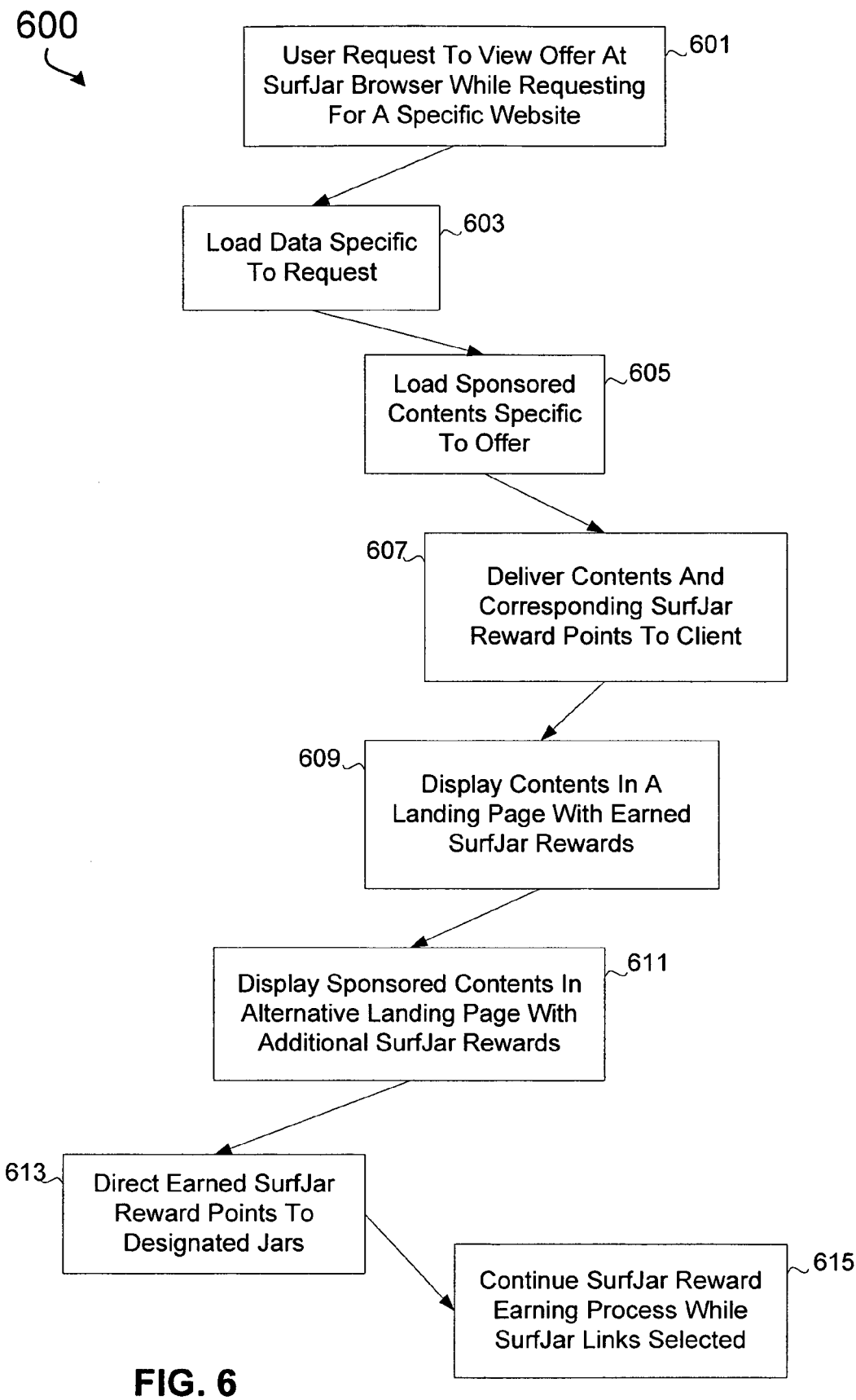
FIG. 6 is a simplified schematic flow diagram that illustrates one alternative potential routine that enables a subscriber to access an alternative landing page with sponsored content while searching for non-sponsored content, in accordance with a further embodiment of the present invention.
Figure 7:
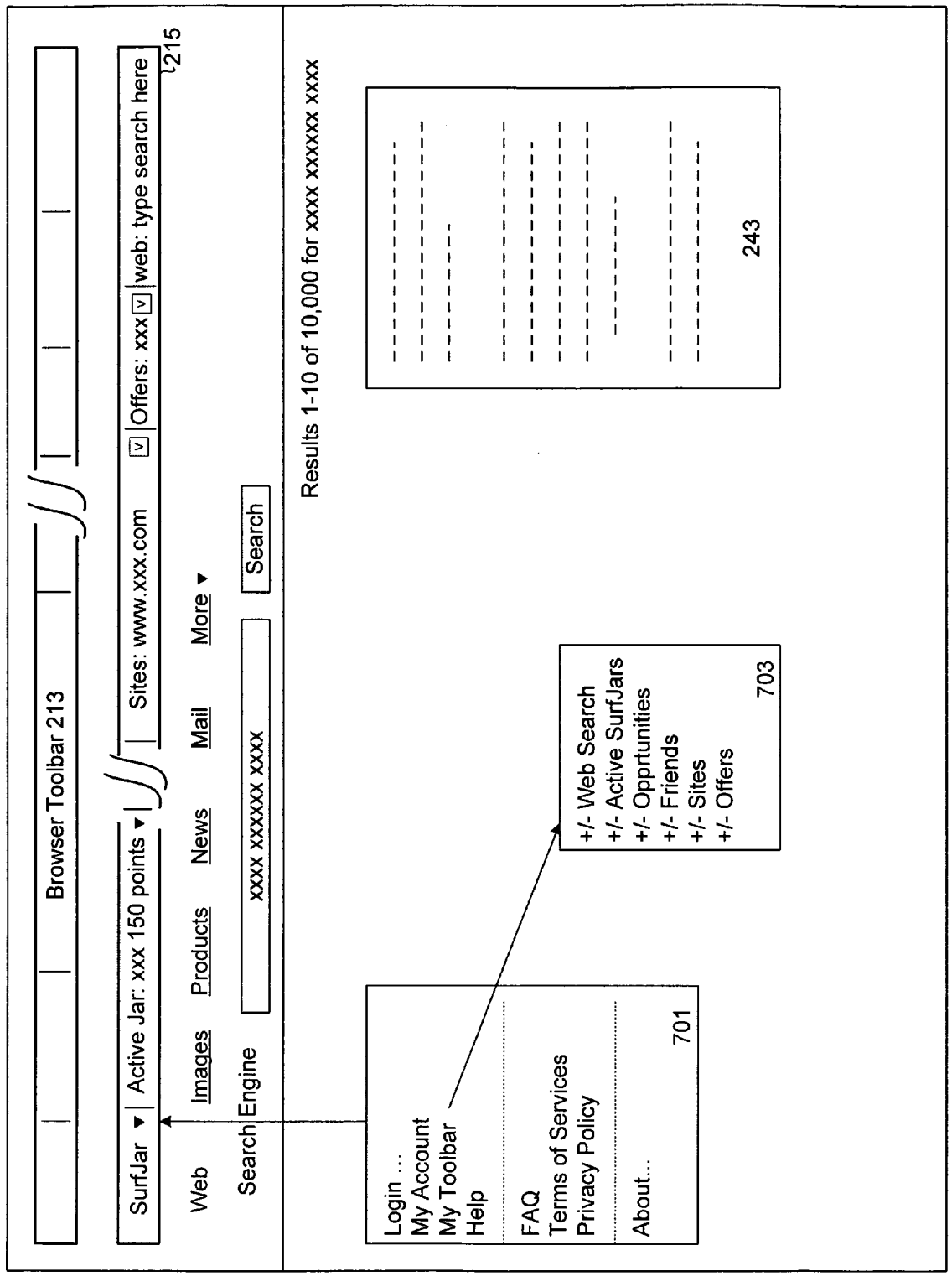
FIG. 7 is an example of an interactive window in a display for an embodiment of the present invention that enables a subscriber to log in a personal account.

FIG. 6 illustrates an alternative routine in flow diagram form, which enables a subscriber to land on a landing page of a featured merchant by clicking the name of the merchant via the SurfJar™ toolbar, in accordance with another embodiment of the present invention. As illustrated by step 601, a subscriber may request information about a specific promotional program offered by a merchant while surfing on web data landed by a SurfJar™ link. With reference also to FIG. 7, the SurfJar™ toolbar provides an input slot, for example, a tab labeled "Site," for the subscriber to click on the featured merchant's name or its URL. The SurfJar™ server system supports the specified web search request by loading and delivering web data from the specifically requested website, as illustrated by step 603 (and by brief reference to FIG. 7). The SurfJar™ server system also supports the request for content related to Offers by loading and delivering web data from the web pages of the featured merchant, as illustrated by step 605. The SurfJar™ server system then calculates and delivers the rewards that the subscriber claims, which the client system displays, as illustrated by step 607. Those of skill in the art will appreciate that the SurfJar™ server system is free to choose or change the featured merchant at will and thus to provide subscribers with whatever the server system determines to be the currently featured merchants (Sites) and Offers.

Performing of step 605 may result in a transactional landing page that requests the subscriber to complete a transaction with the system, for example, to fill out a form or answer a few survey questions or interact with other objects. Additional reward points or other tangible value may be awarded to the subscriber for engaging in such transaction, as illustrated by step 609. The subscriber may direct the claimed reward points to one or more designated destinations, e.g., labeled jars, as illustrated by step 613. While the subscribers continue their web-searching activities, they continue and extend their reward-earning capacity with the assistance of SurfJar™ rewarding system.

Figure 9:
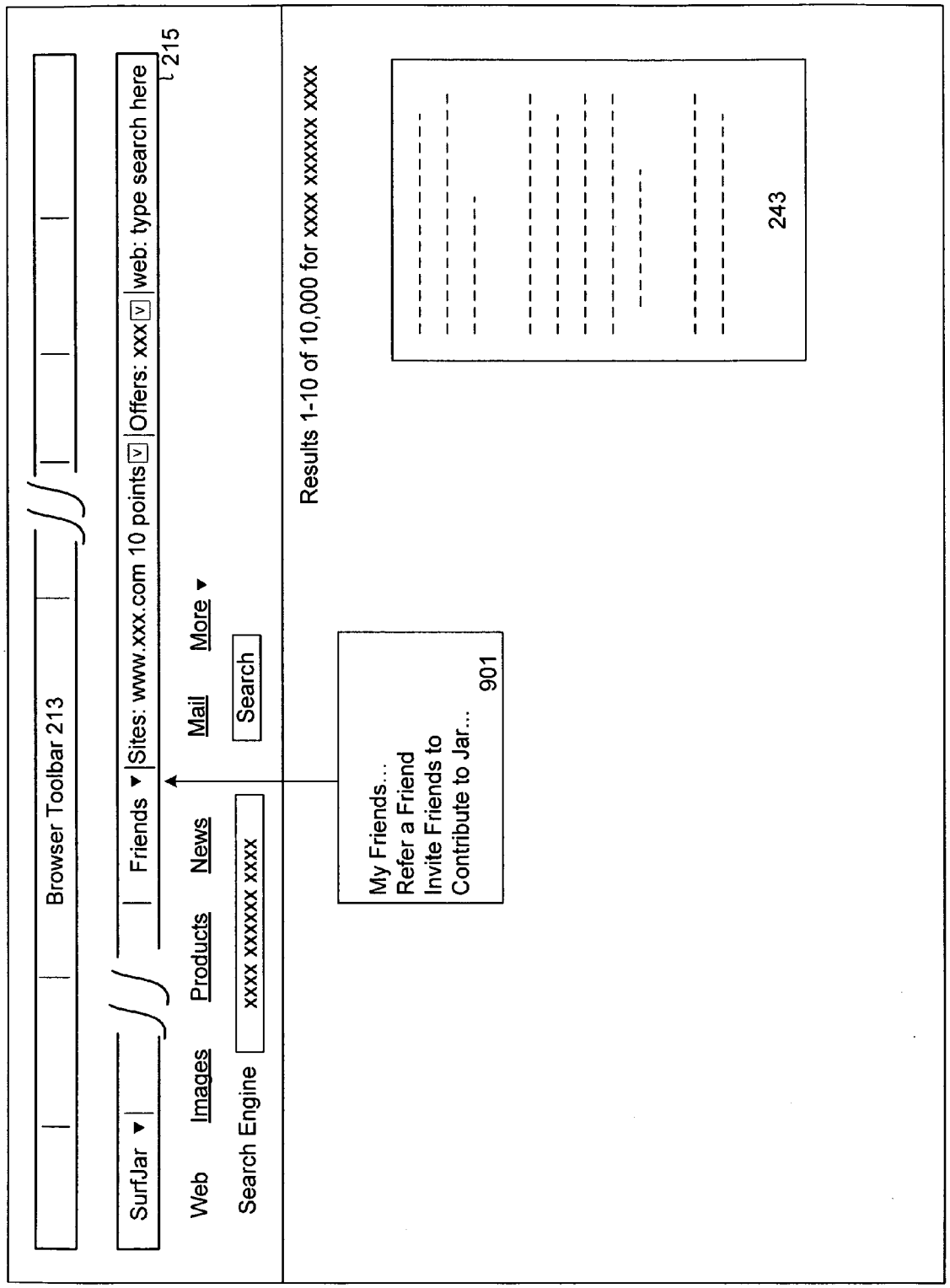
FIG. 9 is an example of an interactive window in a display for an embodiment of the present invention that enables a subscriber to engage or invite friends to the SurfJar™ rewarding program in a social networking environment.

Referencing back to FIG. 2, SurfJar™ toolbar 215 comprises paned windows, each facilitating certain functionality of user interface for the SurfJar™ rewarding mechanism. For example, FIG. 7 shows a screen shot of a paned window 701 labeled SurfJar that provides functionalities including login, my account, seeking help, etc. Interaction with one of the tabs enables the subscribers to implement a desired functionality of the SurfJar™ rewarding mechanism. For example, referencing FIG. 8, a click on the My Account tab allows the subscribers to access their personal accounts for information about earned rewards. An entry at the Site tab enables navigation to the specified merchant's website. Whenever reward points are earned, the Active Jar function is activated to display a logo or a jar indicated of the sponsoring merchant from whose website the reward points are earned. The value of the indicated Active Jar is increased with the earned reward points accordingly. The reward points in the Active Jar are directable to one or more destinations of choice. Only one Active Jar is activated at a time, which associates the web searching activities with the reward point earning capacity. Interactions with the paned windows 801, 901, respectively labeled My Jars of FIG. 8 and Friends of FIG. 9 and associated tabs further assist the subscribers to manage their personal reward accounts.

Figure 10:
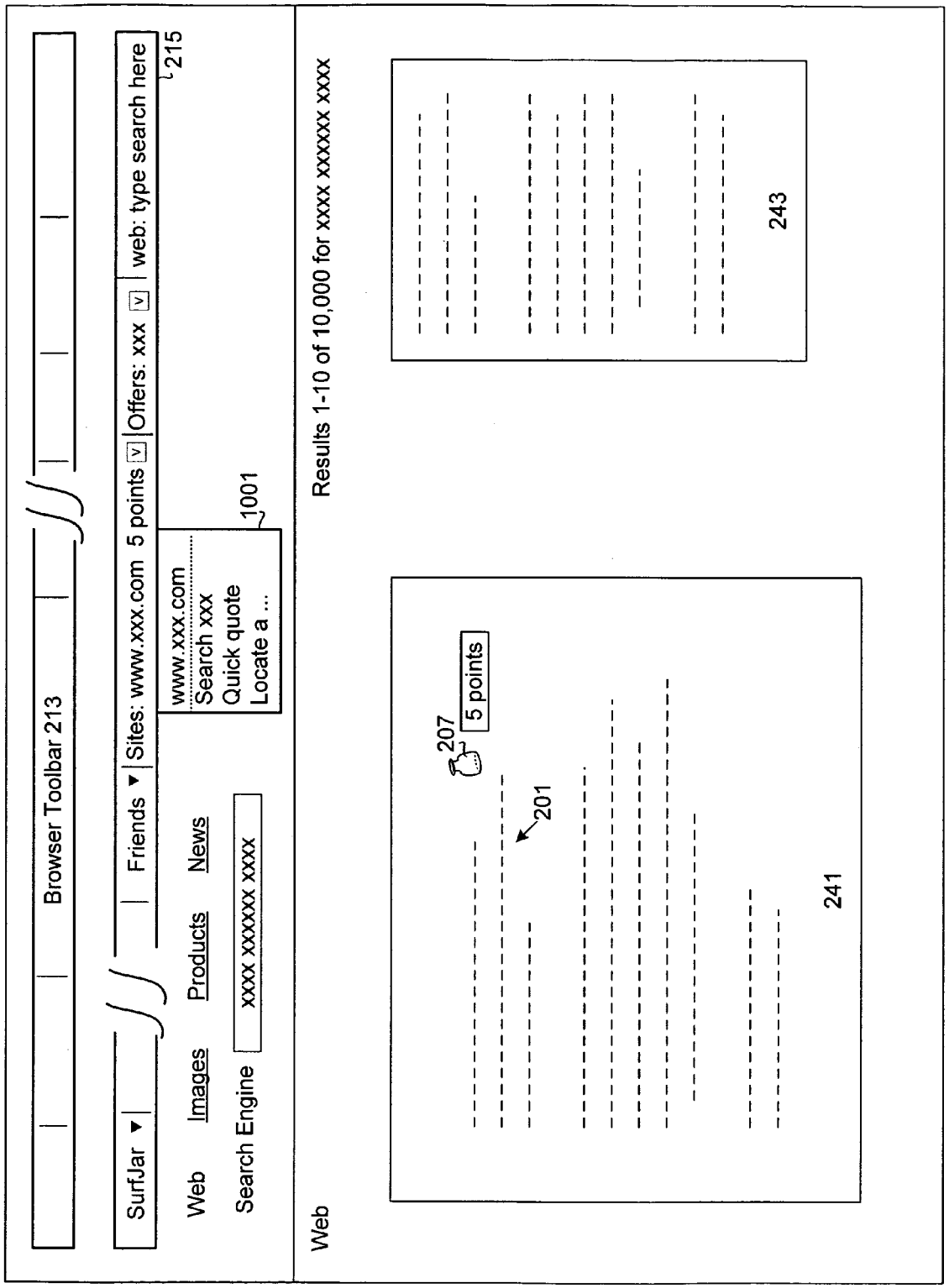
FIG. 10 is an example of an interactive window in a display for an embodiment of the present invention that enables a subscriber to access web pages provided by a selected merchant advertiser participating in the SurfJar™ rewarding campaign.
Figure 11:
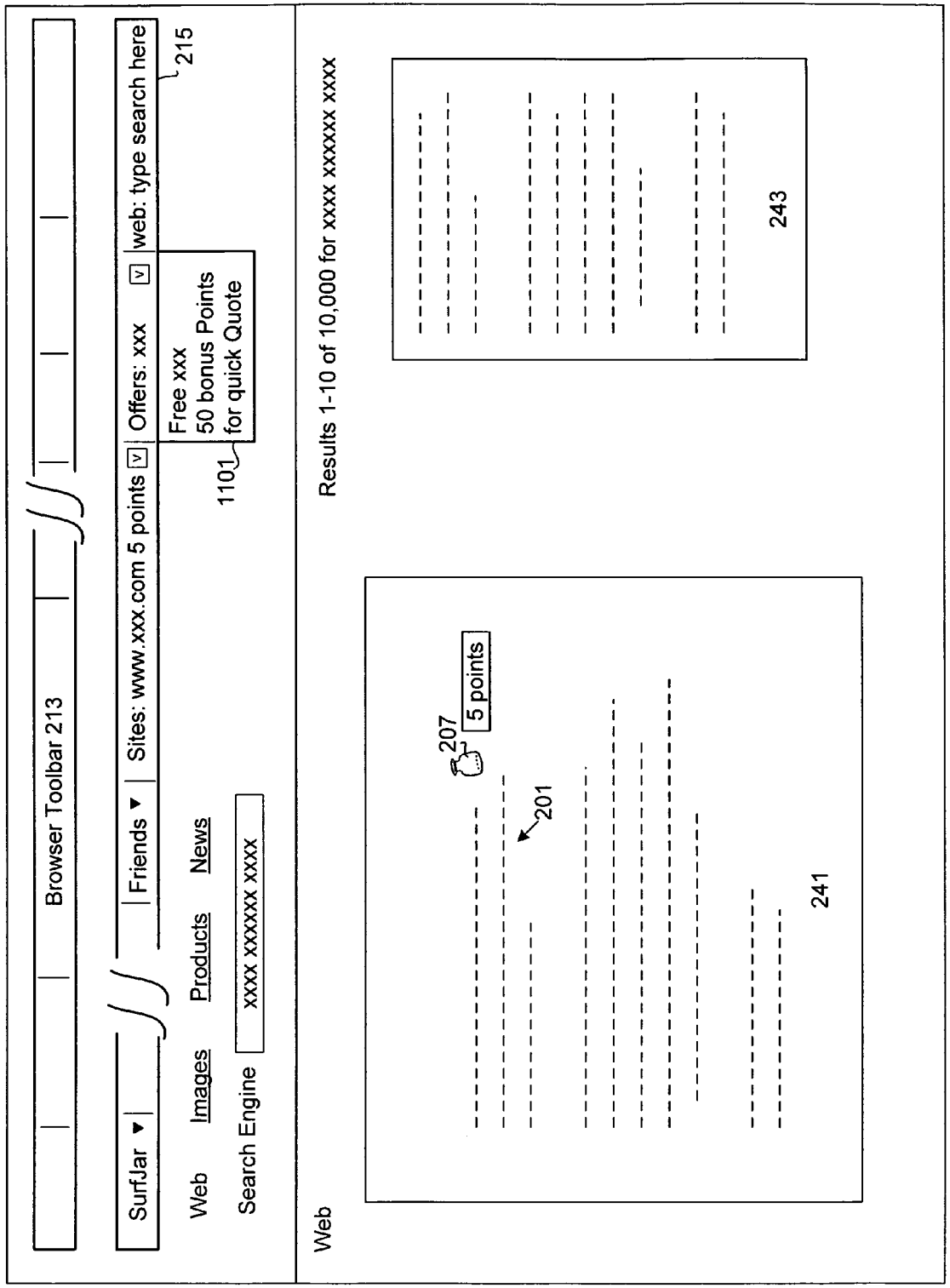
FIG. 11 is an example of an interactive window in a display for an embodiment of the present invention that enables a subscriber to access information of a particular merchant advertiser's rewarding offers.

Referencing FIGS. 10 and 11, the paned windows 1001, 1101, respectively labeled Site of FIG. 10 and Offer of FIG. 11, configured onto the SurfJar™ toolbar to "memorize" a SurfJar™ link that the subscribers have selected during their web searching. The tabs featured in these paned windows interact with the subscribers, which facilitate a ready user interface for their web searching activities. Also, to enhance a merchant's online promotion campaign, both the paned window 801 of FIG. 8 and paned window 1001 of FIG. 10 capture and display the selected SurfJar™ link that can be the merchant's logo or URL, along with its offers and other promotional information. The selected SurfJar™ link remains on the SurfJar™ toolbar until the subscribers move onto another SurfJar™ link and associated URL. Again, any description with reference to any of the figures specified above may be understood to be illustrative of one possible inventive aspect of the invention but not limiting in any way.

Figure 12:
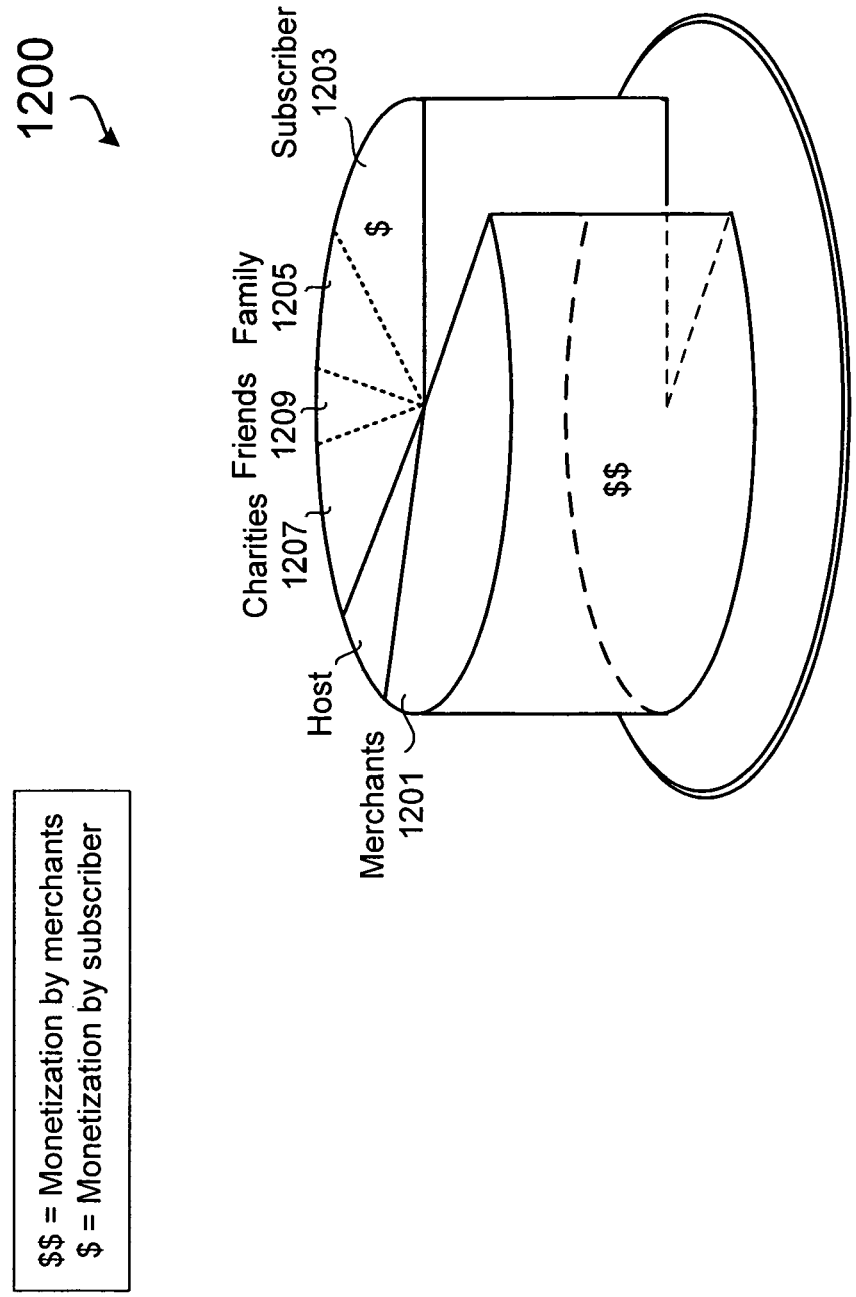
FIG. 12 is a simplified drawing that illustrates one possible monetization structure of the value-added search engine-based web search system, in accordance with an embodiment of the present invention.

FIG. 12 illustrates a cake-sharing scenario or a monetization structure 1200 workable for all the game players as well as third-party beneficiaries of the SurfJar™ reward system that optionally can be implemented in accordance with one embodiment of the invention. Those skilled in the art will appreciate that the illustrated scenario 1200 is only one of many possible structures contemplatable as being within the spirit and scope of the invention. Accordingly, FIG. 12 may be understood to be illustrative of one possible inventive aspect of the invention but not limiting in any way.

In accordance with some embodiments of the present invention, referencing FIG. 12, participating merchants 1201 receive multiple benefits from using the SurfJar™ reward system, which can be measured in dollar amounts. The "$$" represents the multiple benefits receivable by merchants 1201, ranging from saved online advertising cost to increased revenue generated from their SurfJar™ links to web data in the natural domain that enjoy a substantially higher click-through rate. The higher click-through rate is compared with that for web pages in the sponsored domain, as well as that for web pages associated with hyperlinks in the natural domain yet without a SurfJar™ icon appended. Currently, merchants promote their products or services by utilizing online advertising models on search engines, advertising networks, or content websites, and pay for such service. Because of sheer competition for available web real estate and increasingly higher cost, this online advertising model has become no longer profitable for many merchants. Nevertheless, promotional information in the paid or sponsored domain may provide the major online advertising means for merchants before a novel, effective revenue-generating system, such as SurfJar™ rewarding system, becomes available to them.

The "$" sign represents money that can be earned by subscriber 1203 by way of clicking on SurfJar™ links after becoming a subscriber to the SurfJar™ rewarding campaign. An individual subscriber daily limit or other safeguard mechanisms may be imposed on the earnings of subscriber 1203 to prevent abuse or fraudulent activities. The third-party beneficiaries including family members, friends, or charities of choice of the subscriber 1203 may also enjoy a derivative benefit from the SurfJar™ rewarding system when subscriber 1203 directs the redeemed reward points to them. The rewarding system host 1207, e.g., SurfJar™, receives a portion of the cake, a small percentage of the revenue generated based on the number of visits by subscribers 1203.

Further referencing FIG. 12, a missing piece from cake 1200 suggests the existence of other game players (cake eaters), for example, search engine providers who may participate in sharing the cake. The size of the missing piece may vary dependent upon current market for paid ads, bargaining power for specific business arrangement, and the emergence of new technology beyond the scope of the present invention.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those of skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those of skill in the art will appreciate that embodiments of the methods and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. A system for providing search engine-based web data integration, comprising:
    an application programming interface configured to add value to selected search engine-based web search, the application programming interface providing one or more user-clickable links to one or more corresponding web data providers, each effectuating an instant navigation to integrated web data, the integrated web data including web data from the selected search engine-based web page representing search results with web data from a reward mechanism representing instant-reward opportunities appended thereto;
    a tag appended to each of the links, the tag indicative of the value-added capacity of the selected search engine-based web search, wherein the tag is clickable by a user:
    a web browser accepting a request from a user via a click on the clickable link or on the clickable tag and enabling an integrated view in a browser window responsive to the request, the integrated view displaying the integrated web data; and
    a web server for fetching the integrated web data upon receiving a request for selected search-engine-based web search, the web server comprising a content manager configured to automatically and instantly store a value-added reward in the user's account upon clicking a selected link,
    wherein the web server's content manager is configured to award the value-added reward to the user without requiting the user to purchase a product or service or otherwise to transact business with any of the one or more web data providers upon a visit to the one or more of the corresponding links, and wherein the value added to the selected search engine-based web search comprises visit-based reward points available to the subscribers upon conducting a single interaction with a tagged link.

2. The system of claim 1, wherein the links comprise one or more of a hyperlink, a data pointer, an icon, a web navigator, a text page, and an indicator capable of directing the instant navigation.

3. The system of claim 2, wherein the integrated web data comprise one or more of text, graphics, and images responsive to the request for the value-added search engine-based web search.

4. The system of claim 3, wherein the application programming interface is further configured to effectuate a user to become a subscriber to the value-added search engine-based web search.

5. The system of claim 4, further comprising a reward mechanism wherein one or more merchants participate in rewarding the subscribers based on a visit to the integrated web data from the selected search engine-based web search.

6. The system of claim 5, wherein the integrated web data is further configured to include a value indicator which is indicative of reward value to the visit by each of the subscribers.

7. The system of claim 6, wherein each of the one or more participating merchants provides the reward value added to the selected search engine-based web search and the web data associated with a tagged link.

8. The system of claim 1, wherein the visit-based reward points are redeemable for monetary value upon a request from a subscriber.

9. The system of claim 8, wherein the redeemable reward points are directable to a designated destination by the subscriber, the designated destination comprising one or more of a family member, a friend, and a charity organization.

10. The system of claim 1, wherein the value added to the selected search engine-based web search comprises a coupon for purchase of a service or merchandise at a discounted price provided by a participating merchant.

11. The system of claim 1, wherein the value added to the selected search engine-based web search comprises an offer for a free service or merchandise to the subscriber from a participating merchant.

12. The system of claim 1, wherein the content manager is a cached web space where the value added to the selected search engine-based web search is available for storage and retrieval.

13. The system of claim 1, wherein the landing page is a sub-window for displaying the web data responsive to the selected search engine-based web search of a subscriber.

14. The system of claim 1, the landing page is an interactive sub-window for capturing personal information input by a subscriber.

15. The system of claim 1, further comprising a search engine integrated to assist in traversing metadata about selected search results over the Internet.

16. A search engine-based online search enhancing system, comprising:
a server configured to integrate web data including web data from the selected search engine-based web page representing search results and also web data from a reward mechanism representing one or more instant-reward opportunities, the server configured further to the integrated web data upon receiving a request for selected search engine-based online search;
a client configured to provide a user interface that displays one or more links to facilitate subscription to the integrated web data; and
a reward mechanism configured to add value to the selected search engine-based online search results, the reward mechanism configured to provide subscriber access to both the integrated web data and to each of the value-added reward opportunities,
the server, the client, and the reward mechanism collectively configured to establish a platform wherein
a tag indicative of a value-added reward capacity of the selected search engine-based online search results is appended to each of the links;
one or more merchants participating in the reward mechanism provide the tagged links to entice subscription to the selected search engine-based online search;
a value-added reward becomes awardable to a subscriber to the reward mechanism based on a single user interaction with a tagged link without requiring the subscriber to purchase a product or service or otherwise to transact business with the one or more merchants; and
the value added to the selected search engine-based web search comprises visit-based reward points available to the subscribers upon conducting a single interaction with a tagged link.

17. The system of claim 16, wherein the server is configured to fetch the web data responsive to the request for selected search engine-based online search of a subscriber; and
the web data are presented as search results from one or more of natural and paid domains responsive to the selected search engine-based online search.

18. The system of claim 17, wherein the server is further configured to offer the added value to the subscriber.

19. The system of claim 18, wherein the server provides an offer of added value based on a visit to a webpage corresponding to a tagged link from the selected search engine-based online search results.

20. A method for enhancing a search engine-based search online, the method comprising:
establishing with one or more merchants a rewarding mechanism for rewarding subscribers;
appending to selected search engine-based search results in a sub-window a visible tag indicating to a subscriber of the search engine a value-added capacity; and
activating a reward server upon a user's click on a tagged entry, the reward server configured to navigate a subscriber to a selected merchant's webpage corresponding with the tagged entry and automatically and instantly to reward the subscriber for clicking on the tagged entry, the reward server configured further to present to the user integrated web data representing both the selected merchant's webpage and an instant earned-reward confirmation,
wherein a tag indicative of a value-added reward capacity of the selected search engine-based online search results is appended to each of the links; wherein one or more merchants participating in the reward mechanism provide the tagged links to entice subscription to the selected search engine-based online search; wherein a value-added reward becomes awardable to a subscriber to the reward mechanism based on a single user interaction with a tagged link without requiring the subscriber to purchase a product or service or otherwise to transact business with the one or more merchants; and wherein the value added to the selected search engine-based web search comprises visit-based reward points available to the subscribers upon conducting a single interaction with a tagged link.

21. The method of claim 20, which further comprises affiliating the one or more merchants with the rewarding mechanism, thereby enabling the merchants to offer rewards to subscription of the sub-window by way of the tagged entry associated with the offering merchants.

22. The method of claim 21, wherein the enabling comprises enticing the subscriber to select search engine-based search results from the tagged entry for a reward.

23. The method of claim 22, wherein the subscription comprises a clicking by an enticed browser user on a tagged entry.

24. The method of claim 23, which further comprises:
downloading a toolbar to a workstation operated by the enticed browser user.

25. The method of claim 24, wherein the subscription comprises a visiting by a subscriber to the search engine-based search results.

26. The method of claim 23, wherein the rewarding mechanism facilitates managing the subscriber's earned rewards account.

27. The method of claim 26, wherein the managing comprises providing one or more portable compartments, each having a categorical label indicating a destination for the earned rewards, and wherein the compartments are visually differentiated iconographic symbols representative of cached memory space for the earned rewards.

28. A method of augmenting a use of a search engine, the method comprising:
contracting with a merchant to offer rewards to visitors of a website provided by the merchant;
subscribing a user to a reward service;
annotating a link to the website of the contracting merchant for a search engine result with an icon indicative of a reward offer;
detecting selection by a subscribing user of such an annotated link;
providing a reward server configured automatically and instantly upon the selection-detecting to fulfill a reward request from a subscribing user who clicks the annotated link;

providing a user interface configured to permit the subscribing user to designate one of two or more different pots into which to place a reward fulfilled by the reward server; and providing a reward mechanism configured to add value to the selected search engine-based online search results, the reword mechanism configured to provide subscriber access to both the integrated web data and to each of the value-added reward opportunities, the server, the user interface, and the reward mechanism collectively configured to establish a platform wherein a tag indicative of a value-added reward capacity of the selected search engine-based online search results is appended to each of the links;

one or more merchants participating in the reward mechanism provide the tagged links to entice subscription to the selected search engine-based online search; and a value-added reward becomes awardable to a subscriber to the reward mechanism based on a single user interaction with a tagged link without requiring the subscriber to purchase a product or service or otherwise to transact business with the one or more merchants; and wherein the value added to the selected search engine-based web search comprises visit-based reward points available to the subscribers upon conducting a single interaction with a tagged link.

29. The method of claim 28 which further comprises:
providing a mechanism for integrating the reward service, the user interface, and the reward server operable to augment the use of a search engine.

30. The method of claim 29 which further comprises:
providing the user interface with an invitation mechanism for a user to invite a friend to contribute rewards to the designated one of the two or more different pots.

31. The method of claim 28, wherein the reward server is configured to fulfill the reward request without regard to whether the user purchases a product or service or otherwise transacts business with a contracted merchant.

32. The method of claim 28 which further comprises displaying a complete and unfiltered list of search engine browser results including the annotated link, wherein the subscribing user is presented with a selectively annotated list of complete search results from the search engine, the annotated link representing a value-added choice for the subscribing user.

* * * * *

UNITED STATES PATENT AND TRADEMARK OFFICE
CERTIFICATE OF CORRECTION

PATENT NO. : 7,908,262 B2
APPLICATION NO. : 12/070656
DATED : March 15, 2011
INVENTOR(S) : Brian Keith Agranoff and Cameron Clarke Nelson Page 1 of 1

It is certified that error appears in the above-identified patent and that said Letters Patent is hereby corrected as shown below:

Column 12, line 6, "user:" should be changed to --user;--; lines 19-20 (line number 19 being incorrectly labeled 20), "requiting" should be changed to --requiring--.

Column 14, line 36, "a clicking" should be changed to --clicking--; line 42, "a visiting" should be changed to --visiting--.

Column 15, line 7, "reword" should be changed to --reward--.

Signed and Sealed this
Thirty-first Day of May, 2011

David J. Kappos
*Director of the United States Patent and Trademark Office*